US008158056B2

(12) United States Patent
Chai et al.

(10) Patent No.: US 8,158,056 B2
(45) Date of Patent: Apr. 17, 2012

(54) REACTOR FOR PRODUCING METAL NANOPARTICLES AND ARRANGEMENT HAVING THE REACTOR

(75) Inventors: Geun-Seok Chai, Suwon-si (KR); Myoung-Ki Min, Suwon-si (KR); Soon-Ki Kang, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 737 days.

(21) Appl. No.: 12/071,532

(22) Filed: Feb. 21, 2008

(65) Prior Publication Data

US 2008/0277844 A1 Nov. 13, 2008

(30) Foreign Application Priority Data

May 7, 2007 (KR) ........................ 10-2007-0044119

(51) Int. Cl.

| | |
|---|---|
| ***C21B 3/00*** | (2006.01) |
| *C21B 15/04* | (2006.01) |
| *B01J 19/08* | (2006.01) |
| *C25D 1/00* | (2006.01) |
| *B23K 15/00* | (2006.01) |

(52) U.S. Cl. ..................... 266/275; 75/345; 204/157.44; 205/74; 219/121.34

(58) Field of Classification Search ............... 204/157.4, 204/157.44; 219/121, 121.34; 75/345; 205/74; 266/275

See application file for complete search history.

(56) References Cited

U.S. PATENT DOCUMENTS

| | | | | |
|---|---|---|---|---|
| 5,478,149 | A * | 12/1995 | Quigg | 366/273 |
| 5,572,033 | A * | 11/1996 | Grant | 250/353 |
| 6,244,815 | B1 * | 6/2001 | Treat | 415/54.1 |
| 7,297,219 | B1 * | 11/2007 | Menard et al. | 156/173 |
| 2004/0118081 | A1 * | 6/2004 | Reimoser et al. | 52/749.1 |
| 2004/0145053 | A1 | 7/2004 | Auner et al. | |
| 2004/0241430 | A1 * | 12/2004 | Jachuck et al. | 428/330 |
| 2007/0051315 | A1 | 3/2007 | Chen | |

FOREIGN PATENT DOCUMENTS

| | | |
|---|---|---|
| JP | 08-183602 | 7/1996 |
| KR | 10-2000-0065036 | 11/2000 |
| KR | 2000-0065036 | * 10/2001 |

* cited by examiner

*Primary Examiner* — Jessica L Ward
*Assistant Examiner* — Alexander Polyansky
(74) *Attorney, Agent, or Firm* — Robert E. Bushnell, Esq.

(57) ABSTRACT

An arrangement producing metal nanoparticles includes a γ-ray irradiator installed in a radioactive shielding room, a reactor that is disposed to oppose the γ-ray irradiator, and a power supply installed outside the radioactive shielding room to supply power to the reactor. The reactor includes a container receiving reaction materials and transmitting the energy of γ-rays to reaction materials arranged inside of the reactor, an agitator that is installed in the container to be capable of rotating, and a driving source for receiving the power from the power supply to drive the agitator.

22 Claims, 6 Drawing Sheets

REACTOR FOR PRODUCING METAL NANOPARTICLES AND ARRANGEMENT HAVING THE REACTOR

CLAIMS OF PRIORITY

This application makes reference to, incorporates the same herein, and claims all benefits accruing under 35 U.S.C. §119 from an application earlier filed in the Korean Intellectual Property Office on the 7 May 2007 and there duly assigned Serial No. 10-2007-0044119.

BACKGROUND OF THE INVENTION

1. Field of the Invention

The present invention relates to an arrangement for producing metal nanoparticles, and more particularly, to a reactor for producing metal nanoparticles, such as fuel cell catalysts, using a process of γ-ray irradiation.

2. Description of the Related Art

A chemical method is generally used to produce metal nanoparticles such as fuel-cell catalysts. In the chemical method, a metal precursor of reaction materials is reduced and thus the metal nanoparticles are generated. The reaction materials include a metal salt used as the metal precursor, a solvent, a dispersing agent (stabilizer), a reducing agent, and the like. In addition, energy irradiation methods for irradiating electron beams, microwaves, ultraviolet rays to reaction materials may be used.

In recent years, as one of the energy irradiation methods, a method of irradiating γ-rays that are high energy electromagnetic waves to the reaction materials has been used to produce the metal nanoparticles.

According to this γ-ray irradiation method, the γ-rays are irradiated to the reaction materials, except for the reducing agent, to generate hydrated electrons, and materials of a variety of chemical species and metal nanoparticles, such as fuel-cell catalysts, are produced by allowing the hydrated electrons to act as a reducing agent for reducing the metal precursor. In order to produce the metal nanoparticles using the γ-ray irradiation method, there is a need for a reactor that can uniformly mix the reaction materials and irradiate the γ-rays with a uniform intensity to the reaction materials.

A contemporary reactor used for performing the γ-ray irradiation includes a container for receiving the reaction materials and an agitator for agitating the reaction materials. The agitator is designed to be operated by a driving device such as magnetic, electric, and/or electronic circuit devices.

The driving device, however, may be damaged by the high energy γ-rays. This kind of damage may cause the malfunctioning or even a breakdown of the agitator, and thus the reaction materials may not be uniformly mixed.

Furthermore, since the container of the contemporary reactor is formed in a cylindrical shape, the γ-rays cannot be uniformly irradiated into the reaction materials due to γ-rays inherent property that γ-rays are irradiated in all directions from the γ-ray irradiator and the intensity of the γ-ray is inversely proportional to the square of a distance.

The above information disclosed in this Background discussion of related art is only for enhancement of understanding of the background of the invention and therefore it may contain information that does not form the prior art that is already known in this country to a person of ordinary skill in the art.

SUMMARY OF THE INVENTION

It is, therefore, one object of the present invention to provide an improved metal particle producing reactor and an improved arrangement having this improved reactor to overcome the disadvantages stated above.

It is another object of the present invention to provide a metal particle producing reactor that may form a uniform irradiation area for γ-rays and may uniformly agitate reaction materials without being affected by the γ-rays, and to provide an arrangement having this reactor.

According to an exemplary embodiment of the present invention, an arrangement for producing metal nanoparticles includes a γ-ray irradiator installed in a radioactive shielding room, a reactor that is disposed opposite to the γ-ray irradiator, and a power supply installed outside of the radioactive shielding room to serve as a supply power to the reactor. In addition, the reactor includes a container receiving reaction materials and transmitting the energy of γ-ray to the reaction materials, an agitator that is installed in the container to be capable of rotating, and a driving source for receiving the power from the power supply to drive the agitator.

The container may include an opening through which the energy is incident and a window covering the opening.

The container may have a wall member provided with at least one planar portion.

The container may have a wall member provided with a planar portion and a rounded portion. In this case, the container may include an opening formed on the planar portion and a window covering the opening. In addition, the opening is formed in a square shape. Further, the window may be formed of polyethylene.

The reactor may further include a fixing frame installed on an edge of the window. At this point, the fixing frame may be coupled to the container by a fastener.

The agitator may include a rotational shaft disposed in the container and one or more agitating blades installed on the rotational shaft.

The driving source may include a pneumatic motor and the pneumatic motor may be connected to a rotational shaft of the agitator.

The reactor may further include an air tube connected to the pneumatic motor.

The reactor may further include an Revolutions per minute (RPM) control member for controlling an RPM of the agitator, wherein the RPM control member is installed on the air tube. At this point, the RPM control member may include an airflow control valve for controlling the amount of compressed air.

The driving source may be one among an electric motor and a film coil brushless motor, and the power supply may supply the power to the driving source.

The driving source may be fixed to the container, and a motor shaft of the driving source may be connected to the agitator.

The arrangement may further include a controller installed outside the shielding room to electronically control power supplied to the driving source.

The container may be formed of aluminum and coated with a protective layer and include a plurality of supports.

According to another exemplary embodiment of the present invention, a reactor for producing metal nanoparticles using energy radiating from a radioactive material includes a container receiving reaction materials and transmitting the energy, an agitator that is installed in the container to be capable of rotating, and a driving source that is connected to the agitator to transmit torque to the agitator using compressed air.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
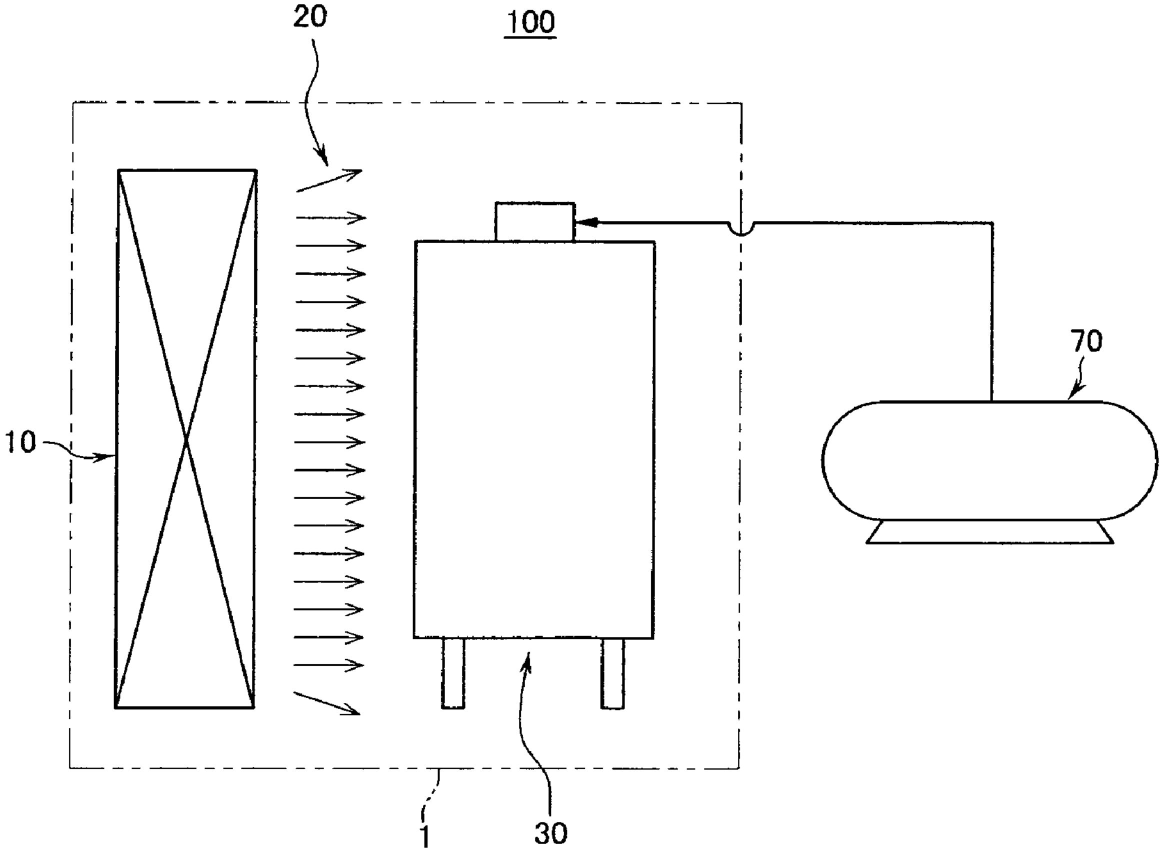
FIG. 1 is a schematic block diagram of an arrangement for producing metal nanoparticles constructed as to a first exemplary embodiment of the present invention.

FIG. 1 is a schematic block diagram of an arrangement for producing metal nanoparticles constructed according to a first exemplary embodiment of the present invention.

Referring to FIG. 1, an arrangement for producing metal nanoparticles 100 of the present exemplary embodiment is configured to produce metal nanoparticles by irradiating energy (for example, γ-rays) radiated from a radioactive substance to a reaction material.

In more details, an arrangement for producing metal nanoparticles 100 generates hydrated electrons and materials of a variety of chemical species by irradiating the γ-rays to the reaction materials including a metal salt used as a metal precursor, a solvent, a dispersing agent (stabilizer), and the like, and produces metal nanoparticles such as fuel-cell catalysts by allowing the hydrated electrons to act as a reducing agent for reducing the metal precursor.

Metal nanoparticle producing arrangement 100 includes a reactor 30 and a γ-ray irradiator 10, which are installed in a radioactive shielding room 1 (radioactive shielding room 1 is represented by a dashed dotted line in FIG. 1), and a power supply such as a compressor 70 is installed outside of radioactive shielding room 1.

γ-ray irradiator 10 is provided to irradiate γ-rays 20, which are emitted together with α-particles and β-particles in accordance with a variation in an energy level in an atomic nucleus.

Here, the γ-rays are electromagnetic waves having high energy, which are radiated as the atomic nucleus is transferred between energy levels. That is, the γ-ray is a kind of radiation that has a higher energy and a shorter wavelength than an X-ray.

Reactor 30 is disposed to oppose to γ-ray irradiator 10 in radioactive shielding room 1. Reactor 30 is configured to receive the reaction materials (not shown) and produces the metal nanoparticles (not shown) by the γ-rays irradiated from γ-ray irradiator 10 while uniformly mixing the reaction materials. A structure of reactor 30 will be described in more detail later with reference to FIGS. 2 and 3.

In the exemplary embodiment of the present invention, compressor 70 is used as the power supply. Compressor 70 is installed at an external side of radioactive shielding room 1 and is connected to reactor 30. Compressor 70 functions as a power source for agitating the reaction material received in reactor 30. To realize this, compressor 70 supplies compressed air to reactor 30.

If compressor 70 is installed inside of radioactive shielding room 1, electronic and electric circuit elements of compressor 70 may be damaged by the γ-rays, which causes the malfunctioning or breakdown of compressor 70. Therefore, compressor 70 is installed at the outside of radioactive shielding room 1.

Figure 2:
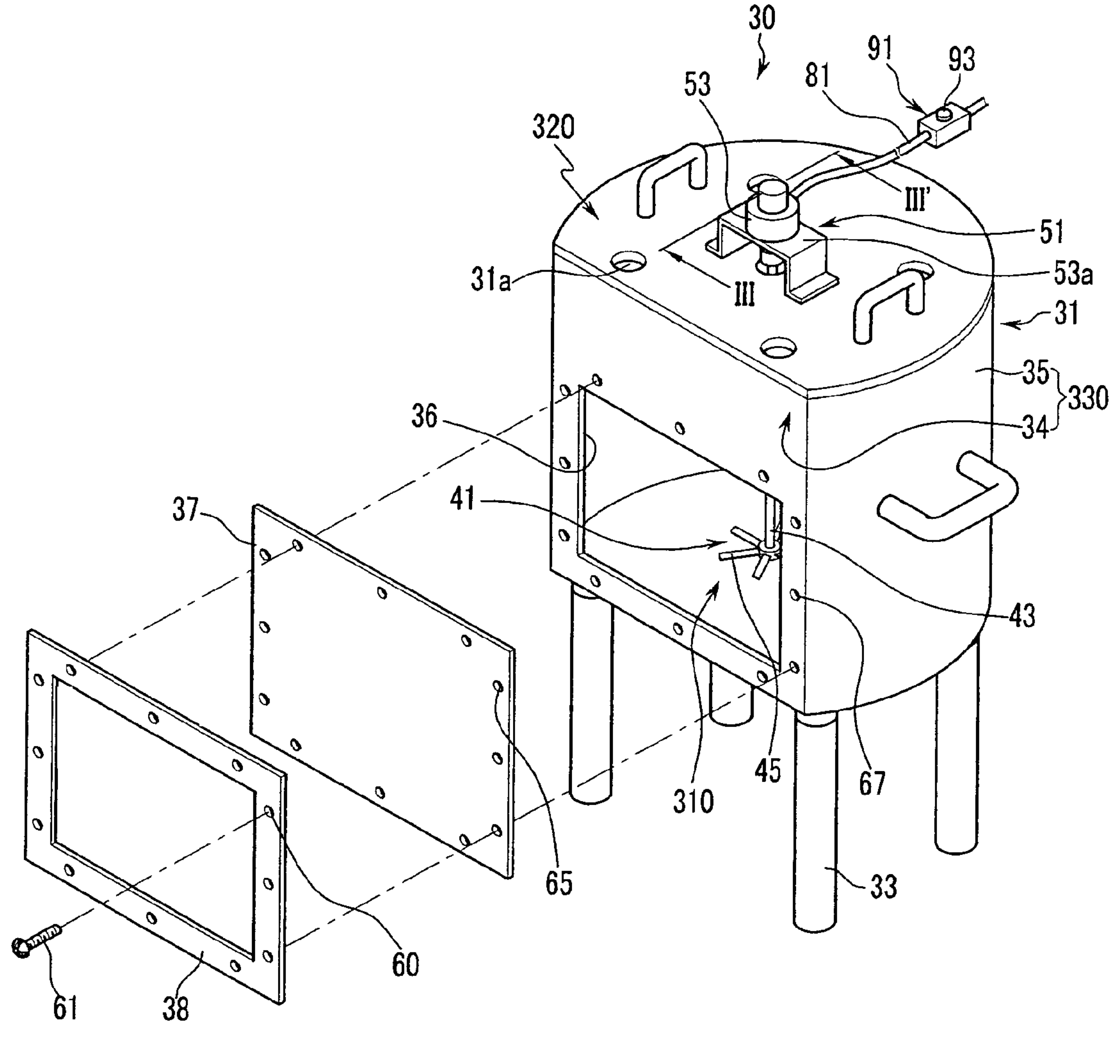
FIG. 2 is an exploded oblique view of a reactor for producing metal nanoparticles constructed according to a first exemplary embodiment of the present invention.
Figure 3:
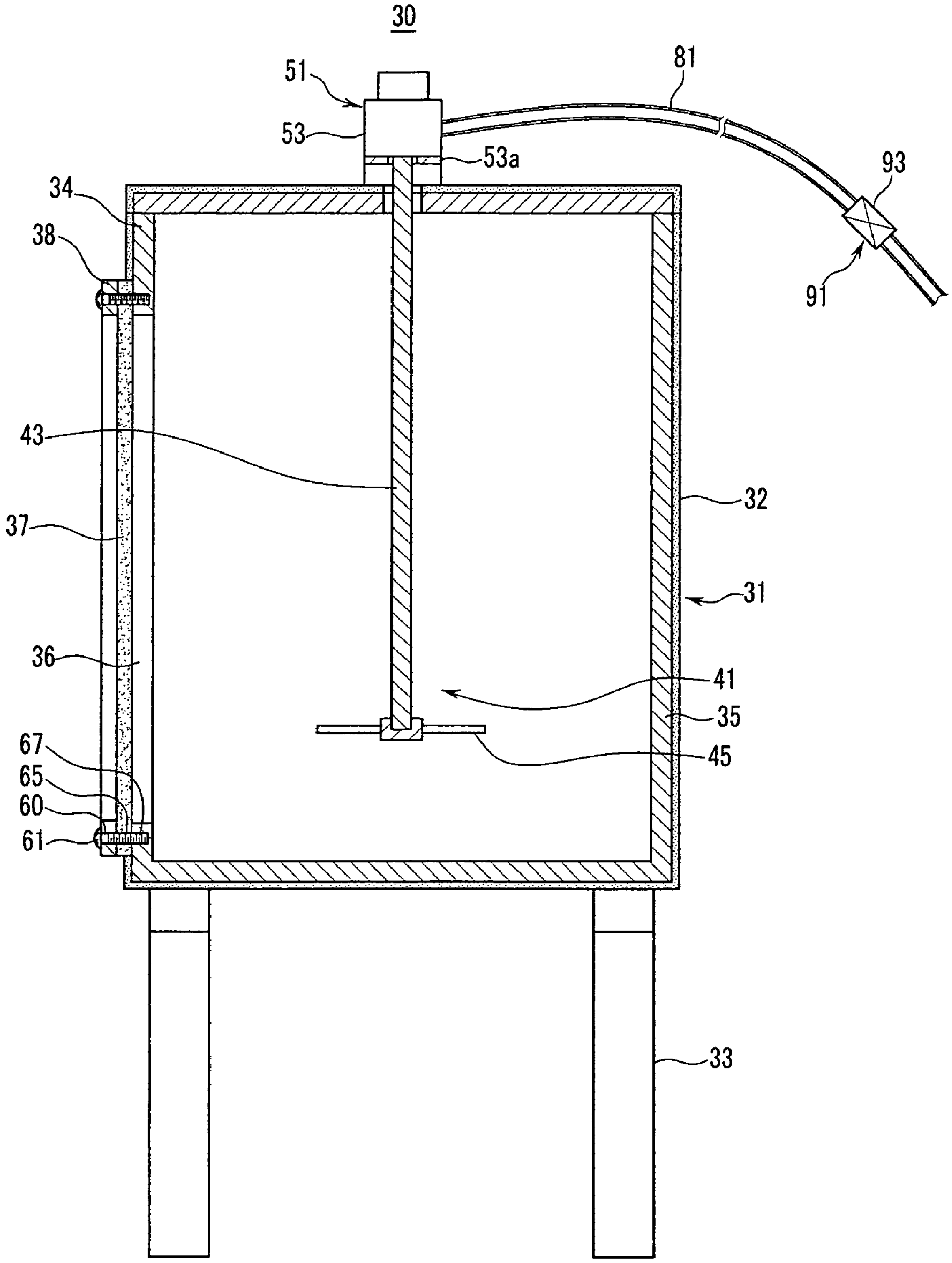
FIG. 3 is a sectional cross-sectional view of the reactor of FIG. 2 cut along line III-III' in FIG. 2, when the reactor is assembled.

FIG. 2 is an exploded oblique view of a reactor for producing metal nanoparticles constructed according to a first exemplary embodiment of the present invention; and FIG. 3 is a sectional cross-sectional view of the reactor of FIG. 2 cut along line III-III' in FIG. 2, when the reactor is assembled.

Referring to FIGS. 2 and 3, reactor 30 of the present exemplary embodiment includes a container 31, an agitator 41 installed in container 31, and a driving source 51 for providing torque to agitator 41.

Container 31 is configured to receive the reaction materials and to allow the γ-rays to be transmitted to the reaction materials. Container 31 has a body defining an inner space having a predetermined volume. The body includes a bottom plate 310, a cover plate 320, and a wall member 330. Container 31 is formed of aluminum and coated with a protective layer 32 formed of Teflon that can protect the body from the γ-rays. Cover plate 320 of the body is provided with a plurality of through holes 31*a* for exhausting reaction gas generated from the reaction material in container 31. Container 31 further includes a plurality of supports 33 for supporting the body at a predetermined height from the floor.

Wall member 330 of container 31 includes a planar portion 34 and a rounded portion 35 planar portion 34 faces γ-ray irradiator 10 (see FIG. 1). Planar portion 34 is provided with an opening 36 through which the γ-rays are incident and a window 37 covering opening 36.

In the present exemplary embodiment, opening 36 is formed in a square shape and window 37 is also formed in a square shape corresponding to the shape of opening 36. Window 37 may be formed of polyethylene that can transmit the γ-rays and is not damaged by the γ-rays. In this case, window 37 is installed on the body of container 31 and is firmly contacted to the body of container 31 by a fixing frame 38. Fixing frame 38 supports a periphery of window 37 and is physically firmly coupled to the body of container 31 by a plurality of fasteners 61 such as bolts. A plurality of through holes 60 are formed in the periphery of fixing frame 38, a plurality of through holes 65 are formed in the periphery of window 37 and a plurality of through holes 67 arranged around a periphery of opening 36 are formed in planer portion 34. And through holes 60, 65 and 67 are formed according to the positions of fasteners. Fasteners 61, therefore, may be able to firmly couple fixing frame 38, window 37 to planer portion 34 by being driven through through holes 60, 64 and 67.

Therefore, in the present exemplary embodiment, since fixing frame 38 supports the edge of window 37 and is coupled to the body of container 31, window 37 may be easily detached from the body of container 31 by simply releasing fixing frame 38. Therefore, it is convenient to replace window 37.

The reason of forming planar portion 34 on the wall member of container 31 and forming square opening 36 on planar portion 34 is to reduce an intensity deviation of the γ-rays with respect to a surface of container 31. That is, the γ-rays are irradiated in all directions from γ-ray irradiator 10 and the intensity of the γ-rays is inversely proportional to a square of a distance. Therefore, by forming opening 36 and window 37 in the planar, square shape, a uniform intensity of the γ-rays may be irradiated to the reaction materials through window 37. Further, the reason for forming rounded portion 35 on the wall member of container 31 is to improve agitating efficiency of agitator 41 when the agitator agitates the reaction materials. That is, since rounded portion 35 closely corresponds to a rotational radius of agitator 41, the contacting area of agitator 41 with the reaction materials may be maximized.

In the present exemplary embodiment, agitator 41 is provided to uniformly mix the reaction materials received in container 31. Agitator 41 is installed in container 31 to be capable of rotating. Agitator 41 includes a rotational shaft 43 disposed in container 31 and agitating blades 45 installed on rotational shaft 43.

Rotational shaft 43 penetrates cover plate 320 of container 31 and is vertically disposed in the space within container 31. Agitating blades 45 are installed on a first end of rotational shaft 43 in container 31. In this case, a second end of rotational shaft 43 is connected to driving source 51 that will be described below.

In the present exemplary embodiment, driving source 51 is provided to supply torque to agitator 41. Driving source 51 includes a pneumatic motor 53 that converts pressure of compressed air supplied from compressor 70 (see FIG. 1) into torque and transfers the torque to agitator 41. Pneumatic motor 53 is firmly installed on cover plate 320 of container 31 by a bracket 53*a*.

Figure 4:
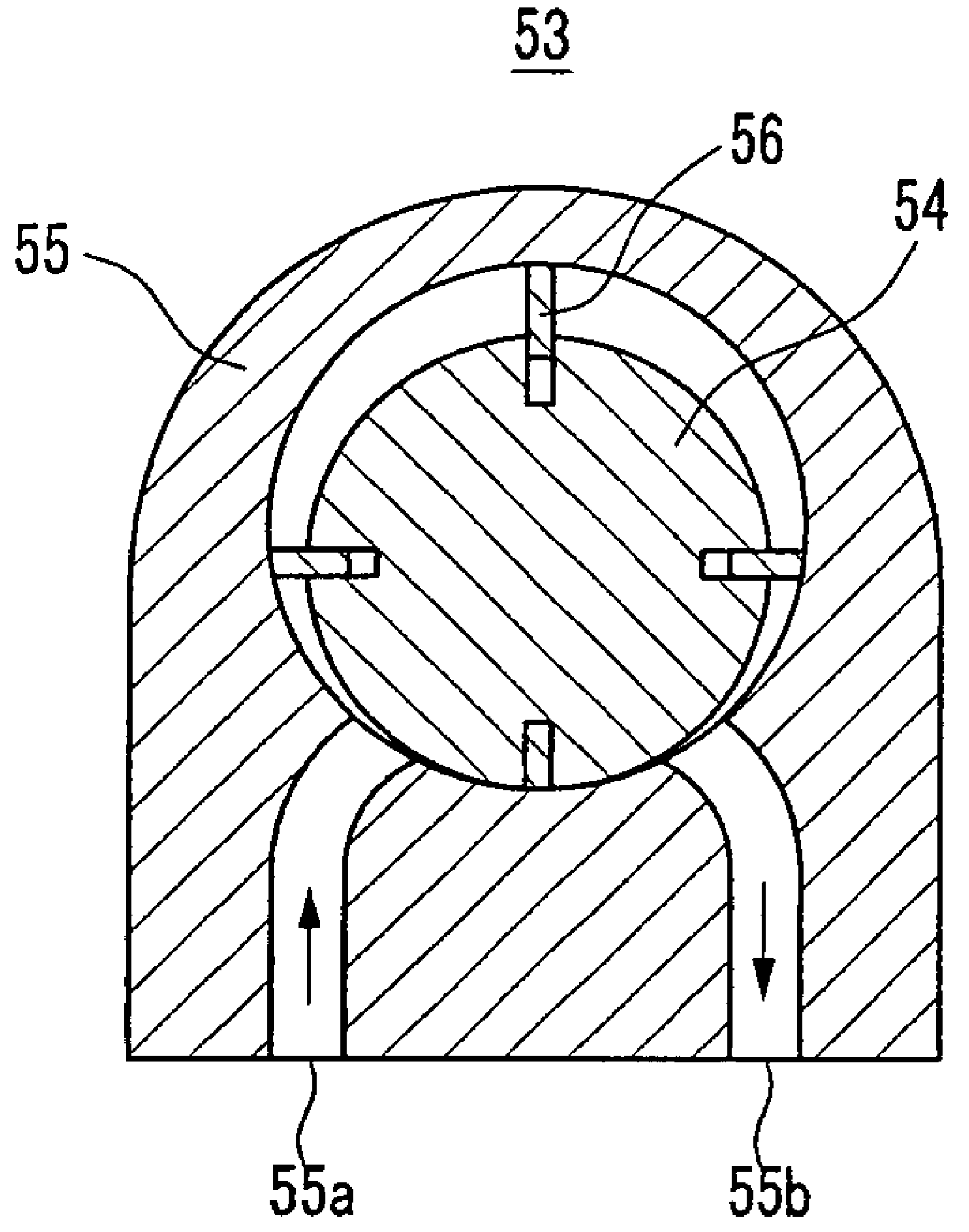
FIG. 4 is a schematic sectional view of a pneumatic motor of the reactor of FIG. 2.

FIG. 4 is a schematic sectional view of the pneumatic motor of the reactor of FIG. 2.

Briefly describing pneumatic motor 53 with reference to FIG. 4, pneumatic motor 53 includes a stator 55, a rotor 54 that is eccentrically installed on stator 55, and a plurality of vanes 56 installed on an outer circumference of rotor 54 and extruding from the interior of rotor to the exterior of rotor 54. In this case, stator 55 is provided with an air inlet 55*a* and an air outlet 55*b* and rotor 54 is connected to the other end of rotational shaft 43 (see FIGS. 2 and 3). Therefore, when the compressed air fed from compressor 70 acts on vanes 56 of rotor 54, rotor 54 rotates by the pressure induced by the compressed air. Since rotor 54 is physically connected to rotational shaft 43, rotational shaft 43 rotates in an identical direction to rotor 54 as rotor 54 rotates. Since pneumatic motor 53 is well known in the art, a detailed description thereof will be omitted herein.

If a motor that uses electric and/or electronic elements to provide the torque to agitator 41 is used for driving source 51, the constituent elements of driving source 51 are damaged by the γ-rays. This causes the malfunctioning or breakdown of the driving source. Therefore, in the present exemplary embodiment, driving source 51 employs pneumatic motor 53 utilizing the compressed air to prevent the above problems.

In the present exemplary embodiment, as shown in FIGS. 2 and 3, pneumatic motor 53 is connected to compressor 70 through an air tube 81. Air tube 81 is formed of polyethylene that is not damaged by the γ-rays. Air tube 81 has a first end connected to air inlet 55*a* (as shown in FIG. 4) of pneumatic motor 53 and a second end connected to compressor 70. An Revolutions per minute (RPM) control unit 91 for controlling an RPM of agitator 41 is installed on air tube 81. RPM control unit 91 includes an airflow control valve 93 for controlling an amount of compressed air supplied from compressor 70 to pneumatic motor 53. Airflow control valve 93 is formed of a conventional two-way valve that can adjust a sectional area of an air passage of air tube 81. By controlling the amount of compressed air supplied from compressor 70 to pneumatic motor 53 through air tube 81, the RPM of rotational shaft 43 can be controlled.

Figure 5:
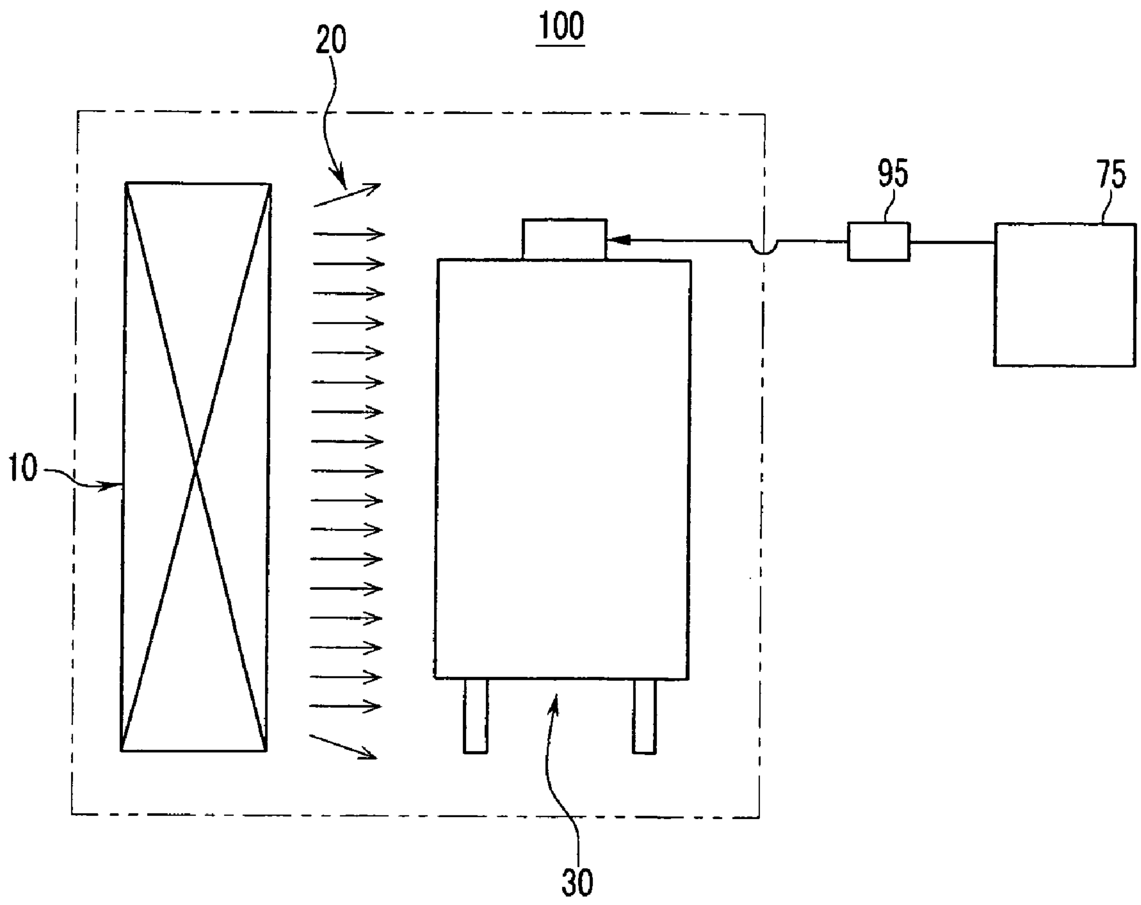
FIG. 5 is a block diagram of an arrangement for producing metal nanoparticles constructed according to a second exemplary embodiment of the present invention.
Figure 6:
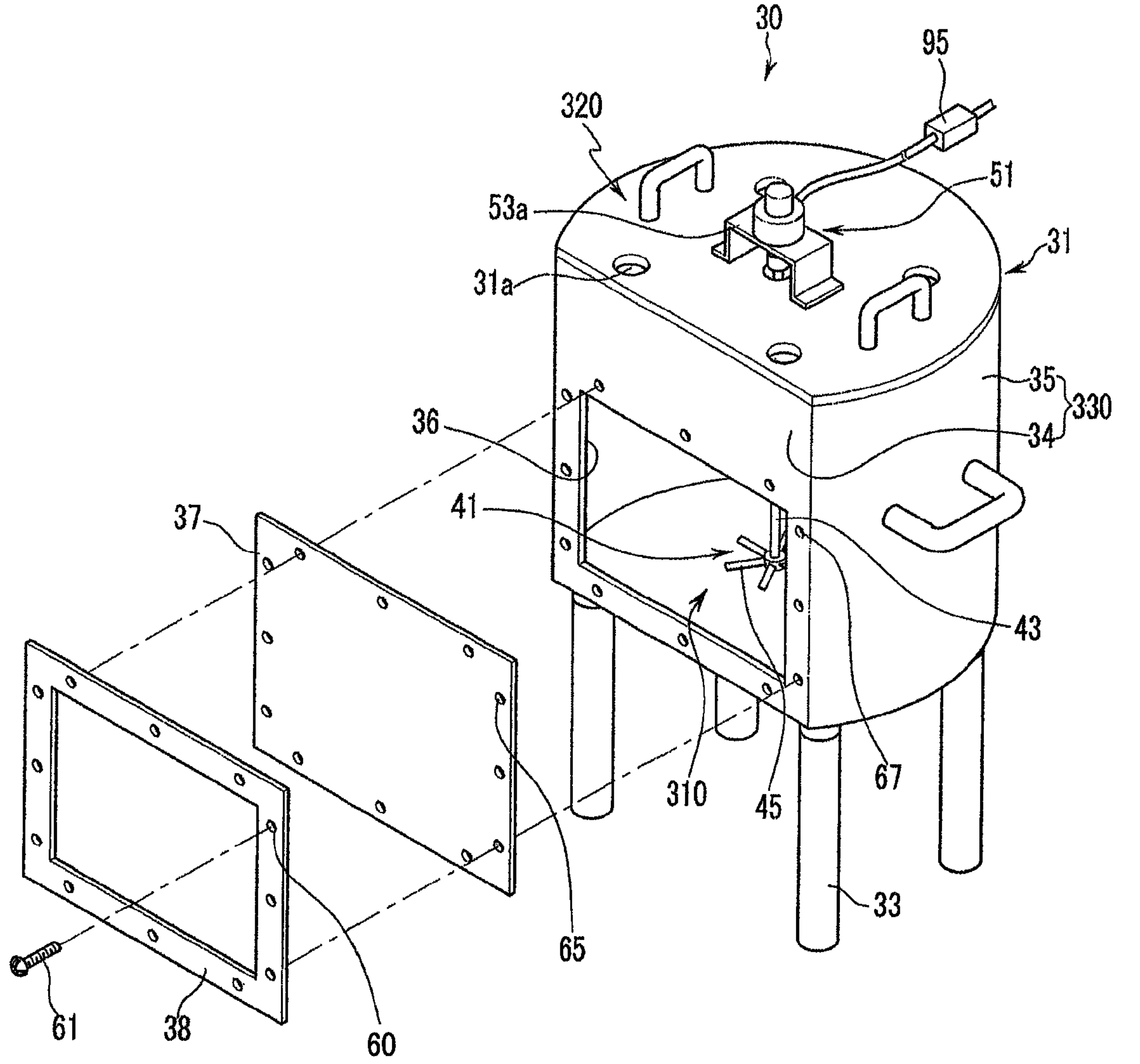
FIG. 6 is an exploded oblique view of the arrangement as shown in FIG. 5.

FIG. 5 is a block diagram of an arrangement for producing metal nanoparticles constructed according to a second exemplary embodiment of the present invention; and FIG. 6 is an exploded oblique view of the arrangement as shown in FIG. 5.

As shown in FIG. 5 and FIG. 6, an electric motor or a film coil brushless motor (BLDC) may be used for driving source 51 constructed according to the second exemplary embodiment of the present invention. The electric motor or the film coil brushless motor may not be deteriorated by the γ-ray because the film coil brushless motor has no electromagnetic component. Rather than using compressor 70 constructed according to the first exemplary embodiment of the present invention, a power supply 75 as the power supply is provided outside radioactive shielding room 1. In the second embodiment, power supply 75 provides electrical energy to drive driving source 51, such as the electric motor or the film coil brushless. By the electrical energy provided by power supply 75, driving source 51 may properly work. A controller 95 for supplying power along with power supply 75 is connected outside radioactive shielding room 1 to control a rotation operation of driving source 51. In this case, a motor shaft (not shown) is interlocked with rotational shaft 43 of agitator 41. The electric motor and the film coil brushless motor are well known to those skilled in the art, and therefore detailed descriptions thereof will be omitted. In addition, elements of the second exemplary embodiment of the present invention perform the same functions as those of the first exemplary embodiment of the present invention, and therefore detailed descriptions thereof will be omitted.

The following will describe an operation of the above-described arrangement for producing metal nanoparticles. The reaction materials are loaded in container 31 in a state where planar portion 34 of container 31 is disposed to face γ-ray irradiator 10 in radioactive shielding room 1.

During the above process, in order to prevent the contamination of the reaction materials in container 31 and to reuse container 31, a disposable wrap (not shown) such as polyethylene vinyl may be disposed on container 31 and the reaction material may be loaded on the disposable wrap.

Next, γ-ray irradiator 10 irradiates the γ-rays to container 31. At this same time, driving source 51 receives power from the power supply, and the agitating blades 45 of agitator 41 are rotated.

At this point, the RPM of agitating blades 45 may be controlled either by adjusting airflow control valve 93 constructed according to the first exemplary embodiment of the present invention or by using controller 95 according to the second exemplary embodiment of the present invention.

Therefore, according to the exemplary embodiments of the present invention, since agitating blades 45 are rotated with a constant RPM by pneumatic motor 53 operating by the compressed air, the reaction materials loaded in container 31 are uniformly mixed.

In the above process, the γ-rays are irradiated to the reaction materials through window 37 of container 31. At this point, since opening 36 and window 37, through which the γ-rays are incident, are formed in a planar, square shape, the γ-rays are irradiated with uniform intensity to the surface of container 31. That is, since the γ-rays are irradiated in all directions from γ-ray irradiator 10 and the intensity of the γ-rays is inversely proportional to a square of a distance, an intensity deviation of the γ-rays irradiated to the surface of the container may be reduced.

Therefore, as the γ-rays are uniformly irradiated to the reaction materials through window 37 of container 31, metal nanoparticles having a uniform size and shape can be produced. The metal nanoparticles may be used as catalysts of a fuel cell.

According to the exemplary embodiment of the present invention, since the driving source having no electric and/or electronic components is used to provide torque to the agitator, the damage of the driving source due to the γ-rays may be prevented.

Further, since the planar portion is formed in the wall member of the container and the square window is installed in the planar portion, the γ-rays may be uniformly irradiated to the reaction materials through the window.

Accordingly, since the reaction materials are uniformly mixed and the γ-rays are uniformly irradiated to the reaction materials, an overall reaction time may be reduced and the metal nanoparticles may be mass-produced. Furthermore, since a reaction atmosphere having an identical condition may be realized in the container, metal nanoparticles having a uniform size and shape may be produced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An arrangement producing metal nanoparticles, the arrangement comprising:

a γ-ray irradiator installed inside of a radioactive shielding room;

a reactor disposed to oppose the γ-ray irradiator; and a power supply installed in an exterior of the radioactive shielding room to supply power to the reactor, said reactor comprising:

a container receiving reaction materials and transmitting energy of γ-rays to reaction materials arranged inside of the reactor, and the container having a top portion and a bottom portion, the bottom portion being disposed opposite to and spaced apart from the top portion, the container having a rounded portion and a planar wall member physically connecting the top and bottom portions, the planar wall member being provided with a planar window facing towards the γ-ray irradiator, an agitator that is installed in the container to be capable of rotating, and a driving source receiving the power from the power supply to drive the agitator.

2. The arrangement of claim 1, with the container comprising:

an opening of the reactor through which the energy of γ-rays are incident; and a window covering the opening of the reactor.

3. The arrangement of claim 1, with the container further comprising:

an opening formed on the planar wall member; and a window covering the opening.

4. The arrangement of claim 3, with the opening being formed in a square shape.

5. The arrangement of claim 3, with the window being formed of polyethylene.

6. The arrangement of claim 3, further comprising a fixing frame installed on a periphery of the window.

7. The arrangement of claim 6, with the fixing frame being firmly physically coupled to the container by a fastener.

8. The arrangement of claim 1, with the agitator further comprising:

a rotational shaft disposed in the container; and at least one agitating blade installed on the rotational shaft.

9. The arrangement of claim 1, with the driving source comprising a pneumatic motor and the power supply comprising a compressor for supplying compressed air to the driving source.

10. The arrangement of claim 9, with the pneumatic motor being installed on and in firmly physically contact with the container, and the pneumatic motor is connected to the agitator.

11. The arrangement of claim 9, further comprising an air tube connected to the pneumatic motor.

12. The arrangement of claim 11, further comprising an RPM control member for controlling an RPM of the agitator, said the RPM control member installed on the air tube.

13. The arrangement of claim 12, with the RPM control member comprising an airflow control valve controlling an amount of the compressed air supplied to the reactor.

14. The arrangement of claim 1, with the driving source being one of an electric motor and a film coil brushless motor, and the power supply supplying the power to the driving source.

15. The arrangement of claim 14, with the driving source being firmly physically connected to the container, and a motor shaft of the driving source being physically connected to the agitator.

16. The arrangement of claim 14, further comprising a controller installed in an exterior of the shielding room to electronically control power supplied to the driving source.

17. The arrangement of claim 1, with the container being formed of aluminum and being coated by a protective layer.

18. The arrangement of claim 1, with the container comprising a plurality of supports supporting the container and the container transmitting the energy to the materials.

19. An apparatus producing metal nanoparticles using energy radiated from a radioactive material, the apparatus comprising:

a reactor, installed inside of a radioactive shielding room, disposed to oppose a γ-ray irradiator, said reactor receiving incident γ-rays provided from the γ-ray irradiator and transmitting energy of γ-rays to reaction materials arranged inside of said reactor;

a power supply, installed in an exterior of the radioactive shielding room, supplying a driving power to the reactor; and said reactor comprising:

a container receiving the reaction materials and transmitting the energy of γ-rays to reaction materials arranged inside of the reactor, and the container having a planar wall member between upper and lower terminal portions of the container and disposed opposite to and facing towards the γ-ray irradiator, and a rounded wall member disposed opposite to and physically connected to the planar wall member, the planar wall member extending over the distance between the upper and lower terminal portions of the container;

an agitator installed in the container to be capable of rotating; and a driving source that is connected to the agitator to transmit torque to the agitator using compressed air.

20. The apparatus of claim 19, with the driving source comprising a pneumatic motor firmly physically contacted with the container, and the pneumatic motor being physically connected to the agitator.

21. An arrangement producing metal nanoparticles, the arrangement comprising:

a γ-ray irradiator installed inside of a radioactive shielding room, said γ-ray irradiator irradiating γ-rays;

a reactor, installed inside of the radioactive shielding room, disposed to oppose to the γ-ray irradiator, said reactor receiving incident γ-rays provided by said γ-ray irradiator and transmitting energy of γ-rays to reaction materials arranged inside of said reactor;

a power supply, installed in an exterior of the radioactive shielding room, supplying a driving power to the reactor; and said reactor comprising:

a container receiving the reaction materials and transmitting the energy of γ-rays to reaction materials arranged inside of the reactor, and the container having a wall member provided with a planar portion disposed between upper and lower terminal portions of the container and disposed opposite to and facing towards the γ-ray irradiator, the planar portion extending over a distance between the upper and lower terminal portions of the container and surrounding a window of the container through which the γ-rays are incident, and the wall member provided with a rounded portion disposed opposite to and physically connected to the planar portion, an agitator installed in the container to be capable of rotating to uniformly mix the reaction materials received by the container, and a driving source receiving the driving power from the power supply to drive the agitator.

22. The arrangement of claim 21, comprised of the planar portion extending over an entirety of the distance between the upper and lower terminal portions of the container.

* * * * *